United States Patent [19]

Fusaro

[11] 4,319,617

[45] Mar. 16, 1982

[54] AUTO TRAVEL SKI BAG

[76] Inventor: Louis V. Fusaro, 7 Mallard La., Smithtown, N.Y. 11787

[21] Appl. No.: 164,182

[22] Filed: Jun. 30, 1980

[51] Int. Cl.³ ............................................. A45C 11/00
[52] U.S. Cl. ...................................... 150/52 R; 150/7; 206/315 R
[58] Field of Search ....................... 150/52 R, 7, 52 C; 224/917; 280/814; 43/26; 229/63; 206/315 R

[56] References Cited

U.S. PATENT DOCUMENTS

| | | | |
|---|---|---|---|
| 184,544 | 11/1876 | Percy | 229/63 |
| 1,565,389 | 12/1925 | Peacock | 150/52 C |
| 1,650,393 | 11/1927 | Schaefer | 150/52 C |
| 1,679,101 | 7/1928 | Sternthal | 150/52 C |
| 2,669,272 | 2/1954 | Permann | 150/7 X |
| 2,723,482 | 11/1955 | Marten | 150/52 R X |
| 3,557,853 | 1/1971 | Jones | 150/7 |
| 3,865,166 | 2/1975 | Pedro | 150/52 R |
| 3,948,302 | 4/1976 | Kohls | 150/52 R |
| 3,972,144 | 8/1976 | Geisler | 43/26 |
| 4,196,762 | 4/1980 | Goodwin | 150/52 R |

FOREIGN PATENT DOCUMENTS 83251  3/1954  Norway .............................. 280/814

*Primary Examiner*—Donald F. Norton
*Attorney, Agent, or Firm*—Richard L. Miller

[57] ABSTRACT

A case inside which a ski can be protectively transported upon an automotive vehicle; the case including a long, plastic bag having an opening in one end thereof closable by an end flap, and a pair of cross straps for tying the bag snuggly around the side of the enclosed ski.

1 Claim, 6 Drawing Figures

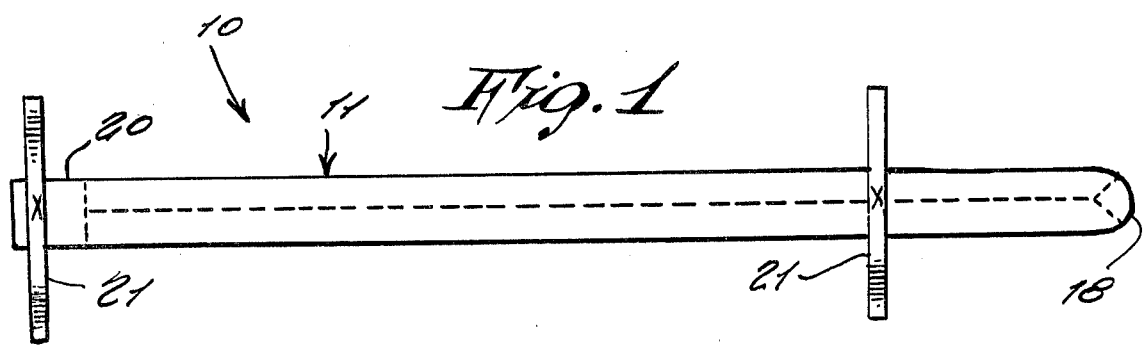
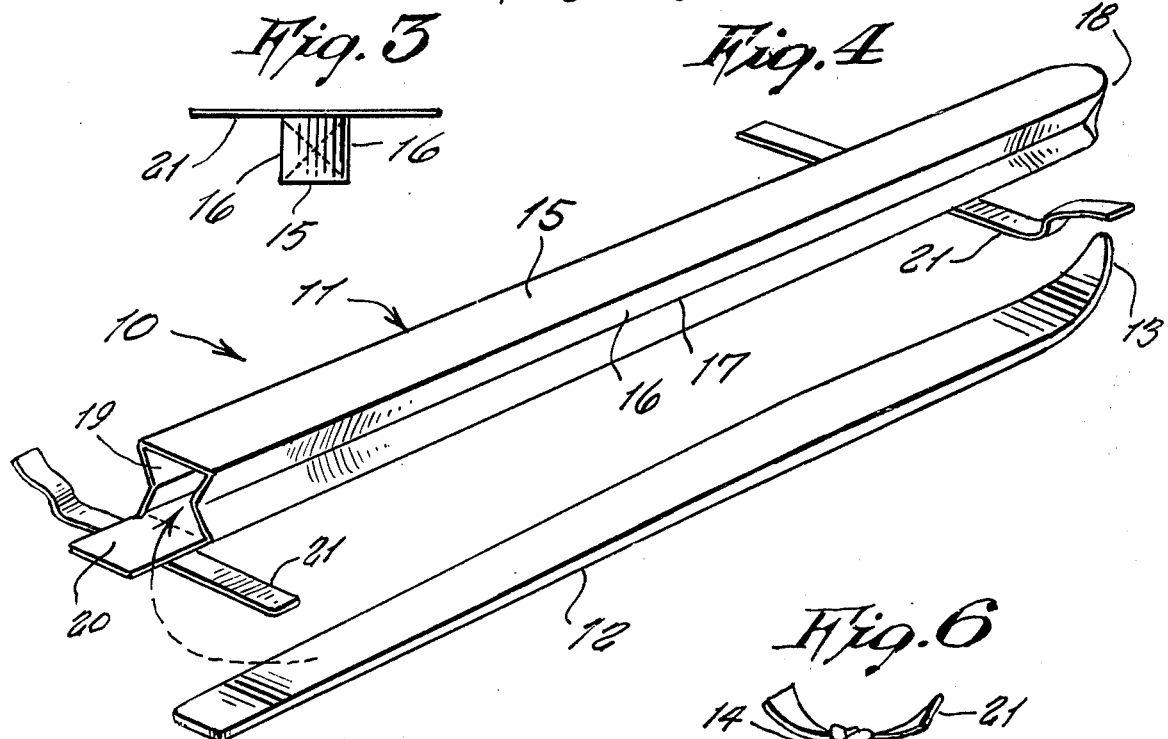
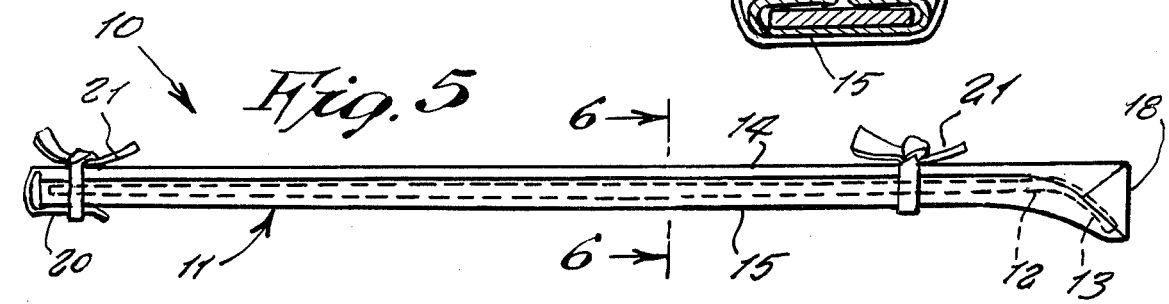

AUTO TRAVEL SKI BAG

BACKGROUND OF THE INVENTION

It is well known that a great many of skiers transport their skis in an exposed manner when travelling between their home and a ski slope, such exposure of the skis making them subject to easily becoming damaged if being struck against other objects. Quality skis are expensive, and in view that they must be carefully maintained by being properly sharpened and waxed for an optimum performance, it is therefore important that such skis are carefully handled so as to not become damaged by being bumped while being transported, either in a crowded public vehicle such as a train or bus, or else upon an automotive vehicle.

SUMMARY OF THE INVENTION

Accordingly, it is a principal object, of the present invention, to provide a ski bag inside which each ski is protectively enclosed while being transported.

Another object is to provide a ski bag which can be readily tied to a rack of an automotive vehicle so as to prevent rattling thereof and being damaged thereby.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a top view of the invention.

FIG. 2 is a side view thereof.

FIG. 3 is a front end view.

FIG. 4 is an upside down perspective view thereof, shown with a ski for being inserted therein.

FIG. 5 is a side view with the ski installed inside the bag.

FIG. 6 is an enlarged cross sectional view taken on line 6—6 of FIG. 5.

DETAILED DESCRIPTION OF PREFERRED EMBODIMENT

Referring now to the drawing in greater detail, the reference numeral 10 represents an auto travel ski bag, according to the present invention, wherein there is an elongated case 11 made so as to enclose a single ski 12 in a safe manner. Accordingly a pair of such ski bags are required in order to hold a set of two skis for a skier.

The case is preferably made of waterproof plastic material which upon its inner side may be lined with a soft padding material such as felt in order to prevent any bang thereagainst transmitting any damage to the ski 12 contained therein.

The ski bag is made of a length, such as for example: 7.5 feet (228.6 cm.) so as to enclose any particular length of ski, and it may measure 5 inches (12.7 cm.) in width and 5 inches in depth, so as to accommodate the ski width as well as a bent over tip 13 of the ski. The bag accordingly includes elongated opposite side panels 14 and 15, as well as elongated opposite edge panels 16 each of which includes an elongated central, inwardly crease or fold line 17 so that the edge panels collapse normally in an accordian fold-like manner, as shown in FIGS. 4 and 6, and the bag is neatly compact, even when a ski is contained therein.

A bottom end 18 of the bag includes the panels 14 and 15 being rounded while the edge panels extend cylindrically therearound. The opposite end of the bag has a full opening 19 for inserton of the ski therethrough. A flap 20 is extended on the end of side panel 14 so as to serve in closing the opening. A pair of transverse, spaced apart straps 21 of flexible suitable material are stitched to the outer side of the flap and also on the outer side of panel 14; the ends of the straps being able to be tied together after wrapping around the bag, as shown in FIGS. 5 and 6.

It is to be noted that in use, only the bottom end 18 of the bag containing the ski tip 13 remains extended full depth while a rest is accordian-folded closed against the flat ski body.

While certain novel features of this invention have been shown and described and are pointed out in the annexed claims, it will be understood that various omissions, substitutions and changes in the forms and detains of the device illustrated and in its operation can be made by those skilled in the art without departing from the spirit of the invention.

I claim:

1. An auto travel ski bag for carrying one ski of a pair of skis comprising, an elongated casing made of a flexible material, said elongated casing having a longitudinal upper face, a longitudinal lower face parallel with said longitudinal upper face, a first side edge surface extending between said upper and lower longitudinal faces from first edges thereof, a second side edge surface extending between said upper and lower longitudinal faces from second edges thereof, said first and second side edge surfaces being parallel with each other when said casing is in its opened ski-receiving position, each of said first and second side edge surfaces having a first longitudinal portion and a second longitudinal portion, said first and second longitudinal portions being connected to each other at a fold line, each said fold line being positioned relative to the side edge of a respective upper and lower longitudinal face such that each said fold line is offset in a direction toward the opposite side edge surface from a plane containing therein said respective side edges of the upper and lower longitudinal faces, each said fold line causing said first and second longitudinal portions of each said side edge surface to extend at an angle to each other with said fold line being the apex of said angle, so that said side edge surfaces have the tendency to collapse inwardly toward each other and thus collapse said casing in an accordian-like manner; said casing further having a front open end and rear curved end, said front open end receiving therethrough a ski for storing in said casing; said casing further comprising a front lid attached to one of said lower and upper longitudinal faces at a front edge thereof; and means for securing the ski within said casing after insertion therein, said means for securing being attached on the exterior of said casing; said fold lines dividing the interior of said casing into an upper and a lower compartment, one of said compartments receiving therein the ski while the other compartment is closed off by said means for securing after entry of the ski in said one compartment; and said rear curved end being fully extended with the ski in said first compartment, said curved rear end receiving therein the curved portion of the ski.

* * * * *